No. 667,028.  
A. D. LUNT.  
ELECTRIC METER.  
(Application filed Oct. 31, 1900.)  
Patented Jan. 29, 1901.

(No Model.)

Witnesses:  
Lewis P. Abell.  
B. B. Hull.

Inventor:  
Alexander D. Lunt,  
by Albert G. Davis  
Atty

UNITED STATES PATENT OFFICE.

ALEXANDER D. LUNT, OF SCHENECTADY, NEW YORK, ASSIGNOR TO THE GENERAL ELECTRIC COMPANY, OF NEW YORK.

ELECTRIC METER.

SPECIFICATION forming part of Letters Patent No. 667,028, dated January 29, 1901.

Application filed October 31, 1900. Serial No. 34,984. (No model.)

*To all whom it may concern:*

Be it known that I, ALEXANDER D. LUNT, a citizen of the United States, residing at Schenectady, county of Schenectady, State of New York, have invented certain new and useful Improvements in Electric Meters, (Case No. 922,) of which the following is a specification.

My present invention involves the application of certain novel principles in electric metering, and is particularly useful for the measurement of direct current, although of course not necessarily limited to employment in this connection only. The current or other quantity to be measured is caused to produce a magnetic field of a value which varies therewith. This magnetic field by suitable means is caused to rotate and acts inductively upon a suitable induced member, the motion of which is retarded by fans or other suitable device. The number of revolutions of this induced member, which is preferably in the form of a disk or shell, is counted by a suitable registering device and furnishes a measure of the energy consumed.

The points of novelty of the invention will be particularly set forth in the claims appended hereto. As for its details and mode of operation reference is to be had for a further explanation of the same to the following description, taken in connection with the accompanying drawings, in which—

Figure 1:
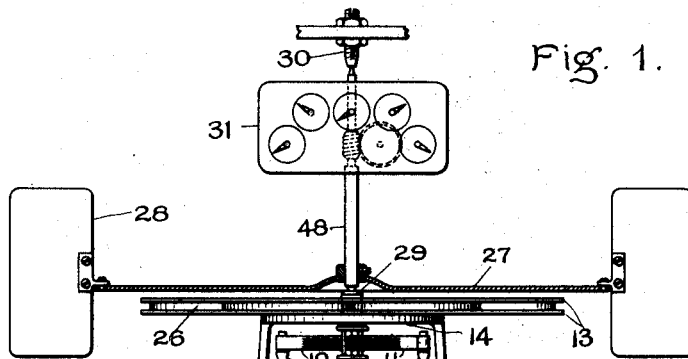
Figure 3:
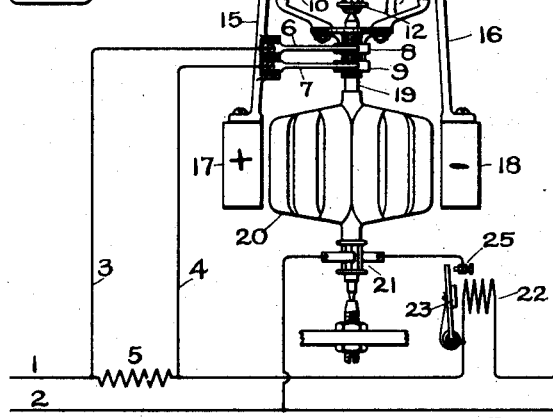
Figure 3:
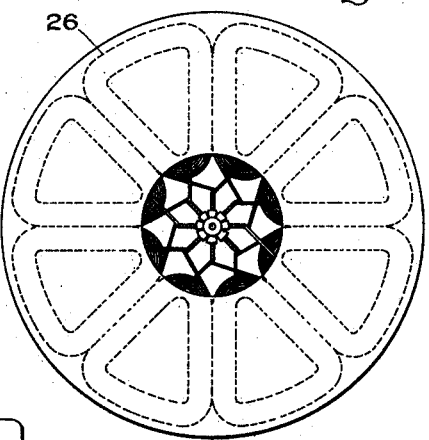
Figure 2:
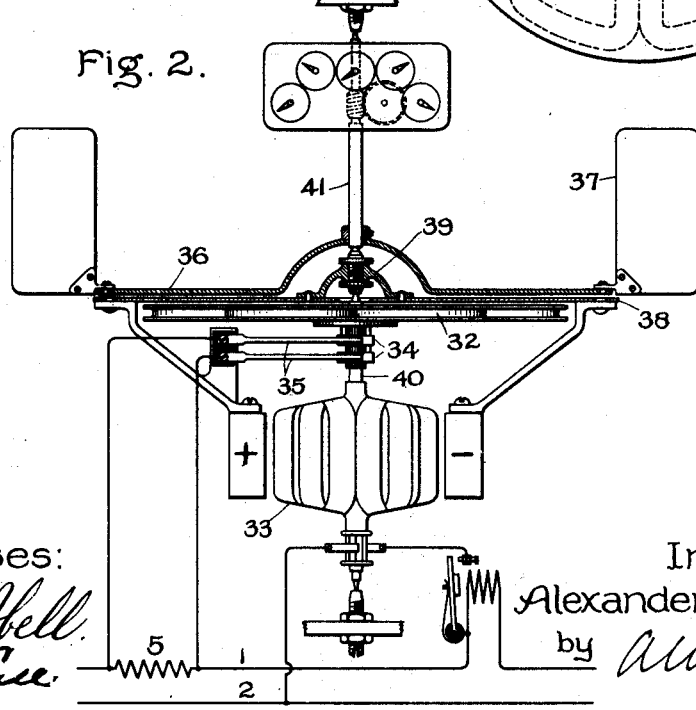

Figure 1 represents a meter embodying my invention; Fig. 2, a modification of the same, and Fig. 3 a detail.

In Fig. 1 the mains conveying energy to be measured are indicated at 1 and 2. A shunt-circuit (represented by the conductors 3 4) connected across a resistance 5 in series with the main 1 conveys an electromotive force proportional to the current flowing in the mains 1 2. The conductors 3 4 are connected to brushes 6 7, which bear upon the collector-rings 8 and 9, respectively, these collector-rings being connected in turn with the revolving brushes 10 and 11, which bear upon a stationary commutator 12. The commutator 12 has its segments connected to a continuous disk-winding mounted between two retaining-plates 13. A plan view of this winding is shown more clearly in Fig. 3, which needs no special description. The disk-winding and its retaining-plates 13 are supported upon some fixed portion of the meter—as, for example, upon a circular plate 14, having the downwardly-extending standards 15 16, of non-magnetic material, fastened to the pole-pieces 17 18 of a motor, upon the shaft 19 of which are mounted the collector-rings 8 9, heretofore referred to. The pole-pieces 17 and 18 are intended to represent the poles of a permanent magnet, in conjunction with which the armature 20 operates, this armature being of the ordinary direct-current type and connected through commutator and brushes 21 and suitable conductors across the supply-mains 1 and 2. Of course any other suitable form of motor, either mechanical or electrical, may be employed, if desired. The motor illustrated is intended to be in normal operation whenever current flows in the mains 1 and 2 and being supplied by constant potential current runs at practically constant speed.

In order to prevent undue waste of energy at times when no current flows in the supply-mains 1 and 2, I may provide a device whereby the armature-circuit of the motor is open-circuited when no current flows in the mains. As shown in Fig. 1, this consists of a coil 22, in series with one of the mains 1 2. Current in this coil acts upon a spring-retracted armature 23, which when attracted by current in the coil closes the armature-circuit through the contact 25 and opens the circuit when current in the coil ceases to flow.

Mounted in close inductive relation to the disk-winding (indicated in Fig. 1 at 26) is a disk 27, of some good conducting material, on the outer edge of which are mounted a series of fan-blades 28, formed either out of the material of the disk or out of any other suitable substance—as, for instance, sheets of mica. This disk 27 is carried by a shaft 48, pivoted at its lower end in a bearing 29, carried by the supporting-plate 14, and at its upper end to a similar bearing 30. A counter 31 is geared to the shaft in the usual manner, so as to register its number of revolutions.

In the operation of the meter the magnetic field produced by current in the winding 26 is caused to rotate by rotating the brushes 10 and 11, which are moved at a practically-constant speed by the electric motor 20. A dragging effect is thus produced on the induced member or disk 27. The field due to the current in the winding 26 being thus rotated at constant speed sets up in the disk 27 a current which reacts with a torque proportional to the square of the current in the winding 26. Since the retarding action of the fans 28 increases or may be made to increase in proportion to the square of the speed, it follows that the speed of motion of the disk will then be proportional to the current flowing in the winding 26. Since this current is proportional to the current in the mains, the counter 21 will therefore register the amount of current flowing in the consumption-circuits.

Fig. 2 represents a modified form of meter in which the rotation of the field is produced by mechanical rotation of the disk-winding itself rather than by the progressive shifting of connections to the same, as is done in Fig. 1. In Fig. 2 a disk-winding of substantially the same form as shown in Fig. 1 is indicated at 32 and is mounted bodily upon the shaft of the constantly-driven electric motor 33, corresponding to the motor shown in Fig. 1. Two terminals of the winding 32, the commutator being omitted, are connected to collector-rings 34, which by means of coöperating brushes 35 put the winding in connection with the resistance 5, in series with the main 1 of the consumption-circuit.

The rotating disk acted upon by the winding 32 is shown at 36 and is provided with fans 37 in a manner similar to the structure shown in Fig. 1.

In order to do away with the dragging effect of air-eddies produced when the disk-winding 32 is rotated in proximity to the disk 36, I separate the two by a diaphragm of some suitable non-magnetic material—as, for example, a glass plate 38. In the center of this plate is mounted a bearing 39 for receiving the upper end of the shaft 40 of the motor 33 and the lower end of the shaft 41 of the disk 36.

The operation of the meter shown in Fig. 2 is the same in principle as that shown in Fig. 1, the only substantial difference being that the magnetic field due to the winding 32 is shifted by means of angular displacement of the winding itself instead of by shifting connections leading to the winding.

What I claim as new, and desire to secure by Letters Patent of the United States, is—

1. In an electric meter, the combination of a winding fed by current to be measured, means for causing a rotation of the magnetic field due to current in said winding, a rotatable body of conducting material in inductive relation to said magnetic field, and a counter for registering the number of revolutions of said body.

2. In an electric meter for direct currents, the combination of means for producing rotation of a magnetic field due to said direct current, an induced member acted on by said magnetic field, and a counter or other registering device controlled by said induced member.

3. In an electric meter, the combination of a winding fed by current to be measured, means independent of said current for causing a rotation of the magnetic field due thereto, and an induced member acted on by said field.

4. In an electric meter, the combination of a continuously-rotatable induced member, and means for acting on said induced member by a rotating magnetic field produced through the agency of direct current.

5. In an electric meter, the combination of a winding normally traversed by direct current, means for causing a rotation of the field due to said direct current, and a continuously-rotatable induced member acted on by said field.

6. In an electric meter, the combination of an electric motor, a recording mechanism, and means for actuating the recording mechanism by said electric motor through the instrumentality of an electromagnetic drag device.

7. In an electric meter, the combination of a motor, a continuously-rotatable shaft, and an electromagnetic drag device whereby the motor may cause rotation of said shaft.

8. In an electric meter, the combination of a constantly-driven electric motor, a continuously-rotatable shaft, and an electromagnetic drag device for transmitting motion from the motor to the shaft.

9. The combination of an electric motor, a continuously-rotatable device geared to a counter, and an electromagnetic device for transmitting motion from the motor to said rotatable device.

10. The combination of a winding excited by direct current, a motor for putting the winding into continuous motion, a continuously-rotatable induced member within the influence of said winding, and a counter actuated by said induced member.

11. The combination of a winding normally traversed by an electric current, a motor for putting the winding into continuous motion, and a continuously-rotatable induced member within the influence of said winding.

12. A direct-current meter having two relatively movable members, one of which is driven by the reaction of current induced through the instrumentality of the other.

13. In a direct-current meter, the combination of means for producing a rotary magnetic field by energy derived from direct current, an induced member within the influence of said field, and a registering device.

14. A direct-current meter having relatively movable members, in one of which current is induced through the instrumentality of a rotating magnetic field due to direct current supplied to another member.

15. In a meter for direct current, the combination of a recording device, and means for operating said recording device through the instrumentality of electric currents induced by the influence of current to be measured.

In witness whereof I have hereunto set my hand this 29th day of October, 1900.

ALEXANDER D. LUNT.

Witnesses:
BENJAMIN B. HULL,
FRED RUSS.